United States Patent [19]
Allard

[11] 4,073,330
[45] Feb. 14, 1978

[54] TIRE CORD FABRICS FOR BELTS OF BELTED PNEUMATIC TIRES

[75] Inventor: Claude H. Allard, Toronto, Canada

[73] Assignee: Uniroyal, Inc., New York, N.Y.

[21] Appl. No.: 697,893

[22] Filed: June 21, 1976

Related U.S. Application Data

[63] Continuation-in-part of Ser. No. 451,322, March 14, 1974, abandoned.

[51] Int. Cl.$^2$ .............................................. B60C 9/22
[52] U.S. Cl. .......................... 152/361 DM; 152/355; 152/356 R; 152/359
[58] Field of Search ........... 152/354, 357, 359, 361 R, 152/361 DM, 356; 139/425 R, 425 A

[56] References Cited

U.S. PATENT DOCUMENTS

| | | | |
|---|---|---|---|
| 1,875,445 | 9/1932 | Hall | 152/361 R |
| 1,875,517 | 9/1932 | Steere | 152/361 R |
| 3,851,693 | 12/1974 | Takemura et al. | 152/361 DM |
| 3,874,436 | 4/1975 | Hashida et al. | 152/361 DM |

FOREIGN PATENT DOCUMENTS

373,902  4/1923  Germany ..................... 139/425 R

*Primary Examiner*—Drayton E. Hoffman
*Attorney, Agent, or Firm*—Steven H. Bazerman

[57] ABSTRACT

Belted pneumatic tires, each belt ply of which includes both metallic and non-metallic cords interspersed with one another and of which the non-metallic cords are made of a material having a relatively high modulus generally of the same order of magnitude as that of the metal, are disclosed. In a preferred arrangement, each belt ply has steel wire cords arranged in a 1:1 alternating sequence with glass fiber cords. The sequence can be varied by having successive metal wire cords separated by two or more non-metallic cords, or by having successive pairs or greater numbers of metal cords separated by one, two or more non-metallic cords, and so forth. The use in tires of belts of such cords, eliminates tire wear and failure due to buckling and birdcaging of belts formed solely from non-metallic tire cords. This abstract is not to be taken either as a complete exposition or as a limitation of the present invention, however, the full nature and extent of the invention being discernible only by reference to and from the entire disclosure.

7 Claims, 9 Drawing Figures

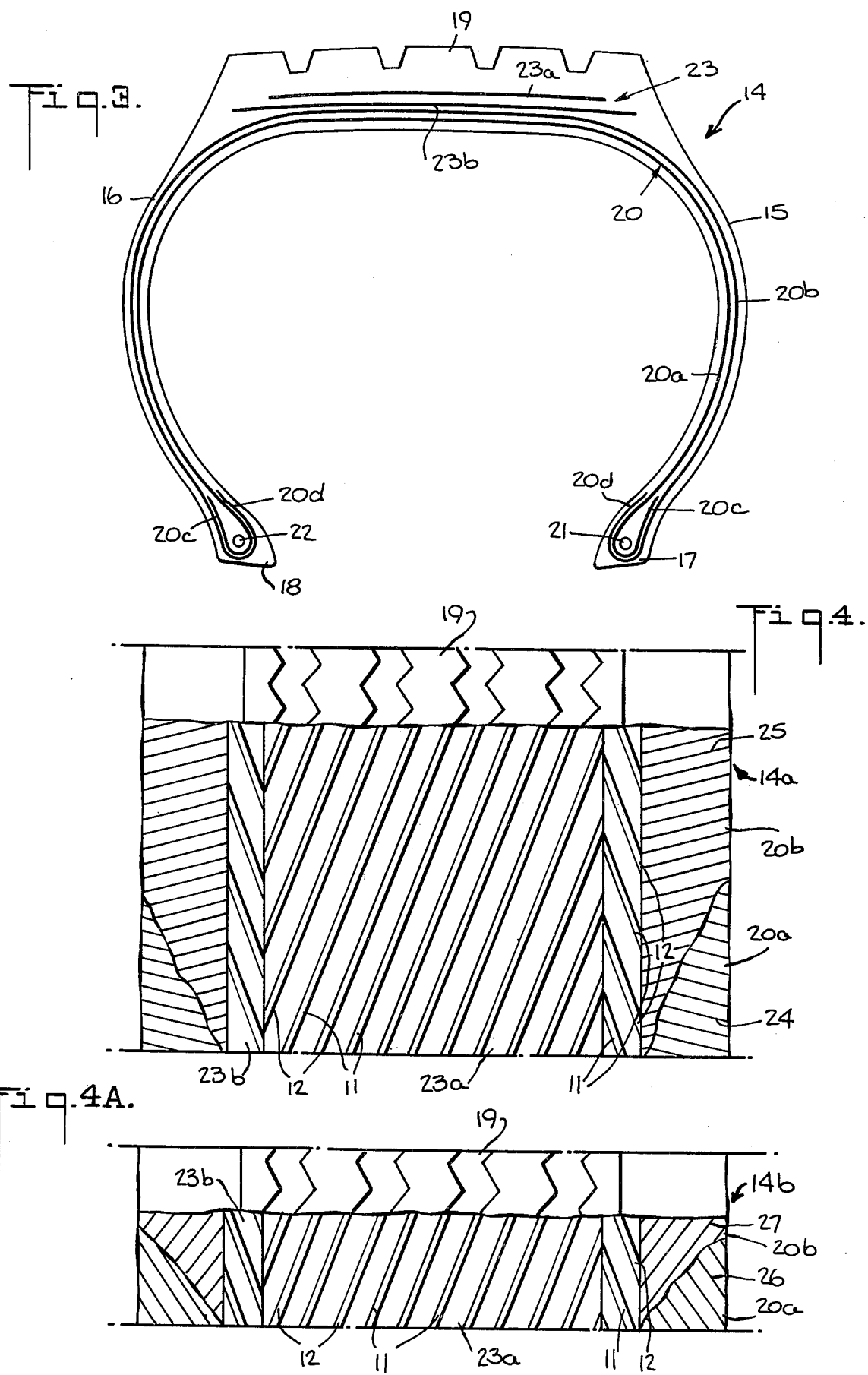

TIRE CORD FABRICS FOR BELTS OF BELTED PNEUMATIC TIRES

CROSS REFERENCE TO RELATED APPLICATION

This is a continuation-in-part of application Ser. No. 451,322, filed Mar. 14, 1974, now abandoned.

BACKGROUND OF THE INVENTION

This invention relates to belted pneumatic tires of the class generally identified as "steel belted" tires, and to novel tire cord fabrics suited for use as the reinforcement means in each belt ply of such tires.

In a belted pneumatic tire (depending on the construction of the tire, the belt structure thereof may include one, two or more individual plies in a variety of superimposed arrangements none of which constitutes any part of the present invention), all the cords in each belt ply are generally made of the same material, i.e. either metal wire such as steel or non-metallic synthetic fiber such as rayon, glass fiber, "Kevlar" (the term "Kevlar" is a trademark of E. I. du Pont de Nemours & Co. and refers to the aramid (aromatic polyamide) fiber recently developed by du Pont and initially called fiber B.) and the like. The cords in each ply are oriented substantially parallel to one another and at an angle between about 0° and about 35° to the median equatorial or mid-circumferential plane of the tire. Tires with belts of one type of cord material will, of course, have different properties than tires with belts of another type of cord material.

Normally the belt plies of tire, and their respective reinforcing cords, are under tension in use and accordingly the cords experience large tension stresses along their lengths. However, during cornering, the belt plies and their respective cords are subject to large compression stresses as well. One of the virtues of steel belts is that by the inherent stiffness of steel, they resist buckling and bird-caging (i.e. the cords spreading open in all directions leaving a void without cords) in cornering due to such compression. Textile filaments because of their low inherent stiffness and high twist are not able to so resist compression forces. Thus in cornering they compress, buckle and birdcage. Such buckling and birdcaging cause excessive tire tread wear and tire failure.

This is particularly evident when the belt cords are formed solely of glass fibers. Glass cords when subjected to sub-zero weather conditions, such as found in the northern United States and Canada, becomes brittle and subject to high-rates of breakage in normal highway use. While bias ply tires having belts composed solely of glass have been in existence for approximately 10 years, the problem of cord breakage has only recently come to light. In the case of bias belted tires the problem of breakage due to compression is minimal since the belt angles are only slightly lower than the carcass angles. Thus in such bias ply tire, breakage of the belt cords due to compression results only in weight non-uniformity, groove cracking and ultimately tire tread separation. In radial tires, the problem caused by the breakage due to compression becomes greatly intensified since the belt angles are much different than the carcass angles. Thus, when breakage of the individual belt cords occur, they lead to blowouts and other forms of extreme tire failure.

This only has become clearly evident since the recent introduction of radial tires having belts reinforced only with pure glass cords. High failure rates, particularly in cold climates, were found upon the introduction of such radial tires.

Testing of such radial tires indicate their lack of reliability. For example, radial tires of this type were tested by placing them in a cooling unit until they reached minus 30° F. They were then mounted on automobiles and allowed to warm to minus 25°. They were thereupon driven five miles in a city environment and across at least one railroad track. Each such cooling and driving period was considered to constitute on cycle. After only one cycle most such tires had large numbers of broken cords. Many tires failed in just one such cycle. Better quality tires having belts with only glass cords lasted from two to five cycles before serious damage or failure.

Such breakage, with the concurrent possibility of extreme tire failure and blowouts, make radial tires with belts having all glass cords all but totally unacceptable.

In belt cords composed of other high modulus non-metallic cords, buckling and birdcaging, while not leading to such extreme failures, do lead to a decrease or tread life. For example when the belt cords are made of Kevlar, tread life average is 7% below that of tires with only steel belt cords.

SUMMARY OF THE INVENTION

It is an important object of the present invention, therefore, to provide a novel class of tire cord fabrics for use as the reinforcements in the belt plies of tires, which fabrics are more economical to produce than conventional metal wire cord fabrics but which eliminate tire wear and failure due to buckling and birdcaging of the belt fabric found in belted tires utilizing non-metallic belt cords.

Broadly speaking, the objectives of the present invention are attained through the use of a tire cord fabric including both metallic warp cords and non-metallic warp cords of a high modulus synthetic fiber interspersed with one another in substantially parallel relation. The warp cords are either in a weftless fabric arrangement or interwoven with relatively widely spaced weft cords (e.g. about ½ inch part) of single or multiple strands of a natural or synthetic textile fiber (e.g. cotton, polyester, polypropylene, nylon, etc.). While the term fabric has been used herein to refer to the reinforcing cords, they do not form a reinforcing fabric in the normal sense of the word. The weft cords are widely spaced and used only to hold the warp cords in position during the building of the tire. The weft has no reinforcing function in a completed tire.

In the preferred arrangement, such as fabric is characterized by a warp cord construction having steel wire cords arranged in a 1:1 alternating sequence with glass fiber cords and polyester picks of weft cords spaced at ½ inch intervals. Warp cord materials other than glass fiber which are suitable and may be used in lieu of glass as the non-metallic component of the fabric include "Kevlar" and any other textile material having a relatively high modulus of $50 \times 10^5$ p.s.i. or more. The sequence of metallic to non-metallic cords can also be other than 1:1, for example 1:2, 1:3, etc.; 2:1, 2:2, 2:3, etc.; 3:1, 3:2, etc., and so forth, depending on the combination of properties desired to be attained in the ultimate belted tires.

Tire cords constructed of steel and glass, in accordance with the above description, exhibit virtually no breakage when subjected to the same cold testing which caused severe breakage and failure among comparable all glass belted radial tires. Equally tires having belts formed from the combination of steel and Kevlar exhibit tread wear patterns superior to that of Kevlar and at least equal to that of steel.

BRIEF DESCRIPTION OF THE DRAWINGS

The foregoing and other objects, characteristics and advantages of the present invention will be more clearly understood from the following detailed description of the invention when read in conjunction with the accompanying drawings, in which:

FIG. 3 is a diagrammatic transverse section through a belted pneumatic tire utilizing in each belt ply a tire cord fabric according to the present invention;

FIG. 4 is a fragmentary developed plan view of the crown region of the tire shown in FIG. 3 and shows, by way of example, a belt construction utilizing a 1:1 sequence of metallic to non-metallic warp cords in each belt ply of a radial tire; and FIG. 4A is a view similar to FIG. 4 but shows the belt as incorporated in a bias ply tire.

DESCRIPTION OF THE PREFERRED EMBODIMENTS

Figure 1:
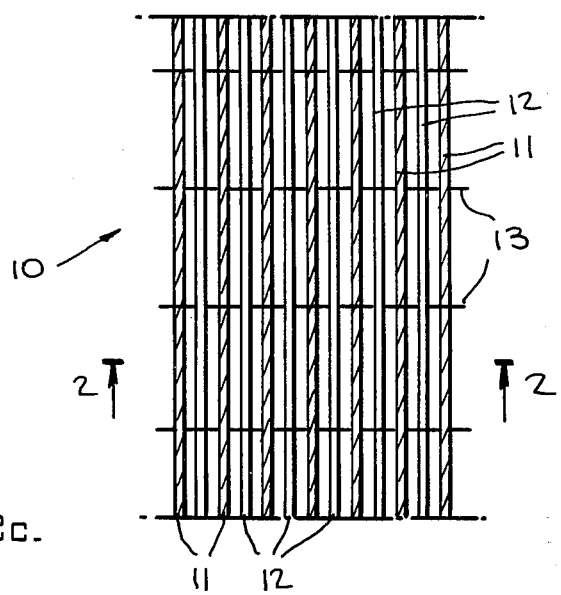
FIG. 1 is a fragmentary plan view of a woven tire cord fabric according to the present invention and shows a 1:1 sequence of metallic to non-metallic warp cords.
Figure 2C:
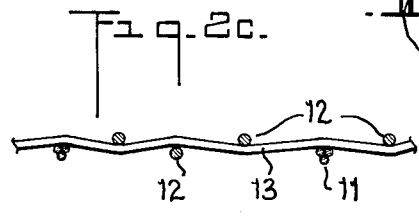
FIGS. 2A, 2B, 2C and 2D are views similar to FIG. 2 but show, respectively, a 1:2 sequence, a 2:2 sequence, a 1:3 sequence and a 2:1 sequence, a metallic to non-metallic warp cords in a tire cord fabric according to the present invention.
Figure 2D:
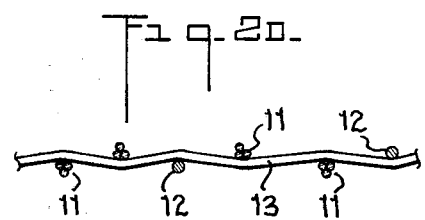
Figure 2:
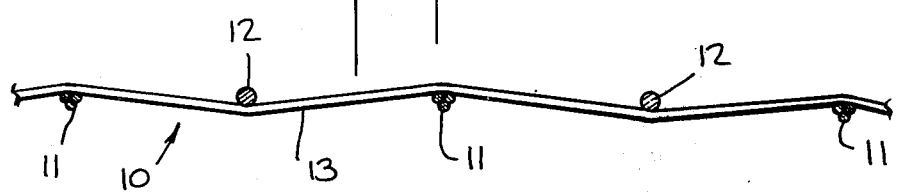
FIG. 2 is a sectional view taken along the line 2—2 in FIG. 1.

Referring now to the drawings in greater detail, there is shown in FIGS. 1 and 2 a woven tire cord fabric 10 composed of a plurality of metal wire tire warp cords 11 alternating in a 1:1 sequence with a plurality of non-metallic tire warp cords 12, all interwoven in either a plain or leno weave (the latter is not shown) with relatively widely spaced weft cords 13. The weft cords 13 may be either monofilamentary in nature, i.e. composed of single continuous filaments, or multifilamentary in nature, i.e. in the form of strands of plural continuous filaments of such synthetic textile fibers, for example, as nylon, polyester and polypropylene (400 denier nylon or polyester monofilament, 500 denier polypropylene monofilament and 840 denier nylon multifilament yarn are representative of these types). Alternatively, the weft cords 13 may be in the form of spun staple fiber yarns of a natural or synthetic textile fiber, for example such as cotton, polyester and like (8/1 cotton count polyester yarn is representative of these types).

Irrespective of their structure, since the function of the weft cords 13 is to stabilize the fabric 10 during construction of the tire, they must be sufficiently strong to permit them to withstand the stresses and strains that will be imposed thereon during handling of the fabric for purposes of calendering, bias cutting and splicing, and building of the actual tire belt structure. Optimally, the weft cords 13 are about ½ inch apart, although their spacing may vary somewhat from this mean value, down to as little as about ⅛ inch and up to about 1 inch. As previously indicated, the tire fabric 10 may also be weftless and, if so, the above discussion on weft cord requirements does not apply.

The metal warp cords 11 normally are in the form of plural wire strands each consisting of several drawn or spun steel wires twisted together (3 × 0.0098 and 5 × 0.0098 wire cords are representative of these types). The non-metallic warp cords 12 normally are suitable multifilament constructions of such synthetic fibers as glass fiber, "Kevlar," and the like (a G75-5/0 glass cord is representative of these types), the primary prerequisite for these fibers being that they must have a relatively high (for non-metallic fibers) modulus generally of the same order of magnitude as that of steel, i.e. a modulus of $50 \times 10^5$ p.s.i. or higher. Accordingly the term "high modulus" when referring to the non-metallic fibers in this application shall means a modulus of $50 \times 10^5$ p.s.i. or higher.

Figure 2A:
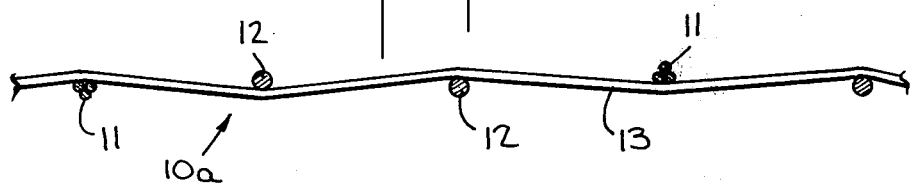
Figure 2B:

Although the tire cord fabric 10, utilizing a 1:1 sequence of metal to non-metallic warp cords, is the currently preferred embodiment of the present invention, it will be understood that fabrics having other combinations of metal and non-metallic cords are also within the contemplation of the invention. Merely by way of example, a tire cord fabric 10a is shown in FIG. 2A which includes two non-metallic cords 12 between each two next adjacent metal wire cords 11, i.e. the metal to non-metallic cord sequence is 1:2. A tire cord fabric 10b is shown in FIG. 2B which includes two non-metallic cords 12 between each two next adjacent pairs of metal wire cords 11, i.e. the metal to non-metallic cord sequence is 2:2. Various other possible cord sequences, such as 1:3 (See FIG. 2C), 1:4, etc., 2:1 (See FIG. 2D), 2:3, etc., 3:1, 3:2, etc., which may be found useful and usable in tires intended for given operating characteristics, have not been illustrated but will readily suggest themselves to those skilled in the art.

Merely to illustrate the manner of use of a tire cord fabric according to the present invention, there is shown in FIG. 3 a belted tire 14 which generally comprises sidewalls 15 and 16 terminating at their radially inwardmost edges in beads 17 and 18 and merging at their radially outwardmost edges into a tread 19 defining the roadcontacting surface of the tire. The body of the tire is reinforced by a tire cord carcass 20 shown as including two plies 20a and 20b the opposite edge regions 20c and 20d of which are turned up about respective bead wire bundles or cores 21 and 22. The tread 19 is reinforced by an underlying belt structure 23 shown as including two plies 23a and 23b.

The carcass 20 may be a radial ply structure, as indicated in FIG. 4 for the tire 14a. In the carcass plies of the tire 14a, the respective cords 24 and 25 normally are oriented at equal but opposite relatively high bias angles of between about 80° and 90° to the median equatorial or mid-circumferential plane of the tire. Alternatively, as indicated in FIG. 4A for the tire 14b, the carcass 20 may be a bias ply structure in the plies of which the respective cords 26 and 27 normally are oriented at equal but opposite relatively lower bias angles of between about 30° and 75° to the median equatorial plane. As will be clear to those skilled in the art, however, the carcass may be a monoply structure or may include more than the two plies described herein.

The belt 23 can be either a monoply structure or can include a plurality of plies, as should be clear to those skilled in the art. If the belt structure 23 contains two plies, as shown in FIGS. 3, 4 and 4A, the metal cords 11 and the non-metallic cords 12 in the plies 23a and 23b are normally oriented at equal and opposite bias angles of up to about 35° to the median equatorial plane of the tire. If a monoply belt structure is used, the cords 11 and 12 normally will be at an angle of substantially 0° to the median equatorial plane of the tire. The illustrated cord sequence in FIGS. 4 and 4A is 1:1, but it could as well be any other sequence within the contemplation of the present invention which is capable of imparting to the tire the desired ride, wear, penetration resistance and speed capability characteristics, subject to the overriding consideration that the tire must be able to withstand any governmentally prescribed high speed, plunger and other safety-related tests.

It will be understood that the foregoing description of preferred aspects of the present invention is for purposes of illustration only, and that the herein disclosed structural features and relationships, as well as the natures of the component materials utilized, are susceptible to a number of modifications and changes none of which entails any departure from the spirit and scope of the present invention as defined in the hereto appended claims.

What is claimed is:

1. A belted tire comprising a toroidal carcass terminating at its radially inward-most edges in a pair of beads, a tread surrounding the region of said carcass, sidewalls outlying the lateral regions of said carcass from said beads to the marginal regions of said treads, and a tread-reinforcing belt structure disposed circumferentially of the crown region of said carcass beneath said tread, said belt structure including at least one ply of a plurality of first continuous filament tire cords in which the filamentary elements are exclusively of metal wire and a plurality of second continuous filament tire cords in which the filamentary elements are exclusively of a high modulus non-metallic synthetic fiber, each ply of said belt structure having all said cords extending in the same direction in closely spaced, non-intertwined, side by side, relation and being interspersed with one another in such a fashion that at least some of said first cords have disposed therebetween at least one of said second cords.

2. A belted tire as claimed in claim 1, wherein the material of which said component filamentary elements of said metal wire tire cords are made is steel, and the material of which said component filamentary elements of said non-metallic fiber tire cords are made in glass fiber.

3. A belted tire as claimed in claim 1, wherein the material of which said component filamentary elements of said metal wire tire cords are made is steel, and the material of which said component filamentary elements of said non-metallic fiber tire cords are made is "Kevlar."

4. A belted tire as claimed in claim 1, wherein the metallic to non-metallic cord sequence in each ply of said belt structure is 1:1.

5. A belted tire as claimed in claim 1, wherein the metallic to non-metallic cord sequence in each ply of said belt structure is 1:2.

6. A belted tire as claimed in claim 1, wherein the metallic to non-metallic cord sequence in each ply of said belt structure is 1:3.

7. A belted tire as claimed in claim 1 wherein the metallic to non-metallic cord sequence in each ply of said belt structure is 2:2.

* * * * *

UNITED STATES PATENT AND TRADEMARK OFFICE
CERTIFICATE OF CORRECTION

PATENT NO. : 4,073,330
DATED : February 14, 1978
INVENTOR(S) : CLAUDE H. ALLARD

It is certified that error appears in the above-identified patent and that said Letters Patent are hereby corrected as shown below:

Col. 6, Claim 2, line 12: the word "in" should read --is--

Signed and Sealed this

Twentieth Day of June 1978

[SEAL]

Attest:

RUTH C. MASON
Attesting Officer

DONALD W. BANNER
Commissioner of Patents and Trademarks